(12) United States Patent  
Winters

(10) Patent No.: US 11,148,073 B2  
(45) Date of Patent: Oct. 19, 2021

(54) TENSILE STRUCTURE DENSITY CURRENT BAFFLE

(71) Applicant: Environetics, Inc., Lockport, IL (US)

(72) Inventor: Richard Steele Winters, Hinsdale, IL (US)

( * ) Notice: Subject to any disclaimer, the term of this patent is extended or adjusted under 35 U.S.C. 154(b) by 0 days.

(21) Appl. No.: 17/015,870

(22) Filed: Sep. 9, 2020

(65) Prior Publication Data

US 2021/0069614 A1 Mar. 11, 2021

Related U.S. Application Data

(60) Provisional application No. 62/897,643, filed on Sep. 9, 2019.

(51) Int. Cl.
 *B01D 21/02* (2006.01)
 *B01D 21/00* (2006.01)

(52) U.S. Cl.
 CPC ..... *B01D 21/0072* (2013.01); *B01D 21/0003* (2013.01); *B01D 21/0042* (2013.01); *B01D 21/0087* (2013.01)

(58) Field of Classification Search
 CPC ............ B01D 21/0003; B01D 21/0042; B01D 21/0069; B01D 21/0072; B01D 21/0087
 USPC ....................... 210/521, 528, 532.1, 541, 801
 See application file for complete search history.

(56) References Cited

U.S. PATENT DOCUMENTS

| | | | | |
|---|---|---|---|---|
| 4,194,976 A * | 3/1980 | Robinsky | ........... | B01D 21/0045 210/521 |
| 5,252,205 A * | 10/1993 | Schaller | ............. | B01D 21/0042 210/521 |
| 5,338,449 A * | 8/1994 | Ichiyanagi | ......... | B01D 21/0003 210/521 |
| 5,597,483 A * | 1/1997 | Schaller | ............. | B01D 21/0003 210/541 |
| 7,416,662 B2 * | 8/2008 | Aditham | ............ | B01D 21/0003 210/521 |
| 7,722,776 B2 * | 5/2010 | Essemiani | .......... | B01D 21/0042 210/801 |
| 8,220,644 B2 * | 7/2012 | Schaller | ............. | B01D 21/0042 210/521 |
| 9,339,742 B2 * | 5/2016 | Schaller | ............. | B01D 21/0003 |
| 10,722,823 B2 * | 7/2020 | Knowles | ............ | B01D 21/0042 |
| 2008/0185334 A1 * | 8/2008 | Schaller | ............. | B01D 21/0087 210/521 |
| 2008/0230463 A1 * | 9/2008 | Schaller | ............. | B01D 21/0042 210/532.1 |

(Continued)

*Primary Examiner* — Christopher Upton

(57) ABSTRACT

A tensile structure density current baffle for use in a clarifier tank having a side wall includes a tensioning cable and a central baffle portion formed from a membrane fabric. The central baffle portion has an upper baffle portion with an upper end, a lower baffle portion with a lower end, and a junction between the upper baffle portion and the lower baffle portion. The tensioning cable engages the central baffle portion at the junction. The upper end of the central baffle portion being fastenable to the side wall above the junction and the lower end of the central baffle portion being fastenable to the side wall below the junction. When the upper end and lower end are fastened to the side wall and the tensioning cable is tensioned, the tensioning cable and membrane fabric comprise a self-supporting tensile structure that extends toward the center of the clarifier tank.

9 Claims, 8 Drawing Sheets

(56) References Cited

U.S. PATENT DOCUMENTS

2010/0193423 A1* 8/2010 Schaller ............. B01D 21/0042
  210/521
2021/0046404 A1* 2/2021 Morgan ............. B01D 21/0003

* cited by examiner

TENSILE STRUCTURE DENSITY CURRENT BAFFLE

RELATED APPLICATIONS

This application claims priority to and the benefit of U.S. Application Ser. No. 62/897,643, filed Sep. 9, 2019, which is incorporated by reference.

BACKGROUND

Sewage or waste water treatment typically involves several steps. One of the steps is clarification. Clarification is the physical treatment process of removing solids before biological treatment. A circular clarifier is a wastewater treatment tank that separates solid substances that readily float or settle from the wastewater being treated.

Circular clarifiers rely on gravity to settle out solids and produce clear effluent. Wastewater influent enters the circular clarifier tank in the center through an energy dissipating feedwell. As the current travels from the center toward outer wall, the solids settle to the bottom. Then the clear water travels up the outer wall toward the effluent weir at the top of the tank wall. Clarifiers use mechanical devices to assist in the removal solid particulates and suspended solids from liquid for clarification and thickening. Floatable solids (scum) are removed from the surface by skimmers while settleable solids (sludge) are collected on the bottom by a rake and removed via a sludge removal system. After the scum and sludge are removed, the clear effluent flows over the effluent weir into the launder trough which directs the clear effluent to the next treatment stage.

Density currents may form in the tank when the denser input from the center feedwell plunges to the bottom of the tank and then moves across the bottom just above the sludge blanket until it reaches the outer wall. It then travels up the tank wall toward the effluent launder. As it courses along the bottom of the tank, the density currents pick up lighter solids, which have been deposited by settling, and the current carries the solids up the wall over the effluent weir. The density current and the solids carried by the density current to the effluent weir short-circuit the main clarification volume of the tank. The results are a significant increase in total suspended solids (TSS) in the effluent and a dramatic reduction in retention time in the tank. Thus, density currents that form in clarifiers have a significant, adverse effect on clarifier performance.

To mitigate the adverse effects of density currents, density current baffles have been developed. Density current baffles may be installed on the outer tank wall between the sludge blanket and the effluent weir. The baffles extend inward toward the center of the tank and they are designed to intercept and dissipate density currents and redirect their flow back into the main clarification volume of the tank. The results are significant reductions in total suspended solids (TSS) in the effluent and dramatic increases in retention time in the tank. Density current baffles can improve plant performance by 35 to 40 percent under average flow conditions and as much as 50 percent during peak flow.

Known density current baffles are typically described as a series of brackets attached to the wall at two-foot intervals and then covered with panels of aluminum, pvc, stainless steel, or fiberglass. Such density current baffles are rigid. The brackets themselves may be made of any of these materials. In one example, a modular fiberglass density current baffle is comprised a series of eight foot long baffle "modules." Each module is a one-piece unit which incorporates the baffle panel, bracket, and mounting and stiffening flanges. The module is molded of fiberglass and the modules interlock to form a rigid structure, once installed. While effective in use, a disadvantage of such a rigid density baffle is that fiberglass molds must be manufactured for every individual tank diameter, then each module must be molded to shape. The rigid modules are not readily adaptable to irregularities and deformities in the tank surface. While these are typical baffle configurations, they are expensive to fabricate and labor intensive to install. Rigid density current baffles involve considerable material handling, and alignment can be tedious and time-consuming.

OBJECTS AND SUMMARY

Objects of the present invention include overcoming the drawbacks associated with prior art and providing an improved baffle design for clarifier tanks that is more effective in redirecting flow of the density currents and the solids back toward the center of the tank, resulting in an improvement (reduction) in Total Suspended Solids (TSS) over existing baffle designs.

A tensile structure density current baffle for use in a clarifier tank having a side wall is provided. The tensile structure density current baffle includes a tensioning cable and a central baffle portion formed from a membrane fabric. The central baffle portion has an upper baffle portion with an upper end, a lower baffle portion with a lower end, and a junction between the upper baffle portion and the lower baffle portion. The tensioning cable engages the central baffle portion at the junction. The upper end of the central baffle portion is fastenable to the side wall of the clarifier tank above the junction and the lower end of the central baffle portion being fastenable to the side wall of the clarifier tank below the junction. When the upper end and lower end are fastened to the side wall of the clarifier tank and the tensioning cable is tensioned, the tensioning cable and membrane fabric comprise a self-supporting tensile structure that extends toward the center of the clarifier tank.

In one example, the tensile structure density current baffle is adapted to be fastened to a circular clarifying tank. Baffles may also be configured for other shapes of tanks.

In some embodiments, the membrane fabric comprises Ethylene Interpolymer Alloy.

In some embodiments, the upper baffle portion is in the shape of a frustum. In some embodiments, the lower baffle portion is also in the shape of a frustum. In some embodiments, the lower baffle portion is curved in the shape of a portion of a hollow torus.

The upper end may further comprise a first hem and the lower end may further comprise a second hem, and the first and second hems are fastenable to the side wall. The tensile structure density current baffle may further comprise a first batten bar for attaching the upper end to the side wall and a second batten bar for attaching the lower end to the side wall.

The junction of the intermediate central baffle may further comprise a conduit, and the tensioning cable is disposed within the conduit.

BRIEF DESCRIPTION OF THE DRAWINGS

The present invention can be best understood through the following description and accompanying drawings, wherein.

DETAILED DESCRIPTION

Figure 1:
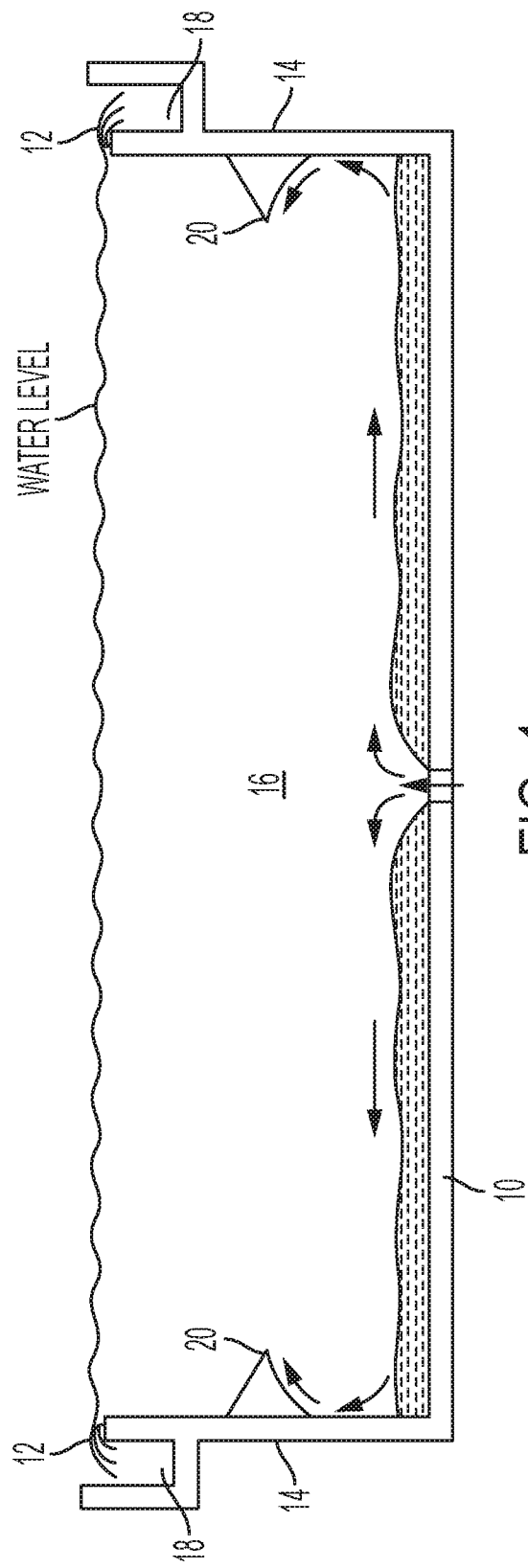
FIG. 1 illustrates an exemplary tensile structure density baffle in a clarifier tank, according to a first example of the invention.

In one embodiment, as illustrated in FIG. 1, an upward curving tensile structure density current baffle 20 is shown within a clarifier tank 10. As shown, the clarifier tank 10 has a central tank portion 16, an outer tank wall 14, a spillway 12, and an effluent channel 18. Density current baffle 20 is typically located along outer wall 14 several feet (e.g. 3 ft.) below the water level which is usually substantially aligned with the level of the spillway 12 into the effluent channel 18.

It is understood that density current baffle 20 may be employed in other shaped tanks (non-circular, oval, elliptical, etc.) and may be employed at various heights along the tank walls. However, for the purposes of illustration, the salient features of inverted density current baffle 20 are described below in conjunction with a typical round clarifier tank having a radius of substantially 100 ft, with a height of tank wall 14 ft.

Figure 2:
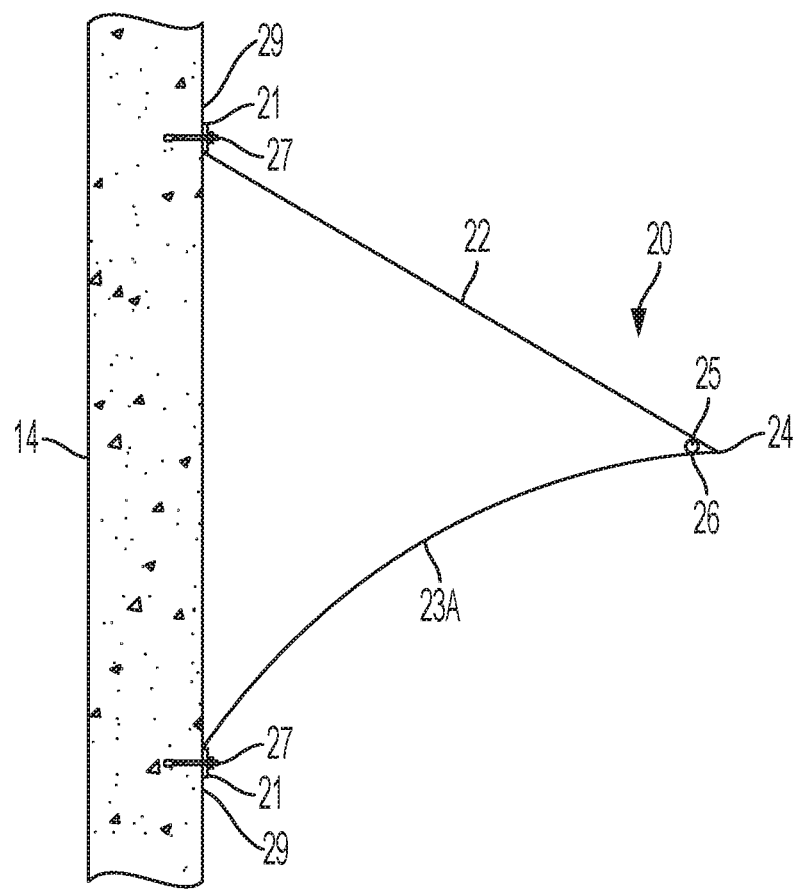
FIG. 2 illustrates a section of the central baffle portion of the exemplary baffle of FIG. 1.

In the example illustrated as shown in FIG. 2, density current baffle 20 maintains a central baffle portion 24 including an upper baffle portion 22 and a lower baffle portion 23A that are configured to be attached at the upper and lower end to side wall 14. A hem 29 along the upper and lower end of the central baffle portion 24 is connected to the tank wall 14. In some embodiments, central baffle portion 24 comprises a geomembrane fabric. The hem 29 is captured between a flat batten bar 21 and anchored to the tank wall 14 with fasteners 27.

The upper baffle portion 22 and lower baffle portion 23A extend outwardly, away from the side wall 14. The inclination angle of the tensile structure current density baffle 20 is 30 degrees as measured from the horizontal and the horizontal projection of the tensile structure current density baffle 20 may be defined by the following equation: Horizontal Projection (Inches)=18 inches+0.3 in/ft×(tank diameter (ft)−30). A junction joins the upper baffle portion 22 and lower baffle portion 23A at an inward end towards the center of the tank 10, creating one continuous tensile membrane shape.

A cable or rope 25 is inserted into a conduit 26 at the interior of the junction of the upper and lower baffle portions 22, 23A of the central baffle 24 towards the center of the tank. Tension is applied to the cable or rope 25 at the interior of the of the tensile structure current density baffle 20 towards the center of the tank. The inward pressure applied to the cable or rope 25 is transferred through the conduit 26 to the junction of the upper and lower baffle portions 22, 23A of the central baffle 24 at the interior of the tensile structure current density baffle 20 towards the center of the tank. As the tension of the cable or rope increases, the upper and lower baffle portions 22, 23A of the central baffle portion 24 are stretched tight into a rigid form commonly known as a tensile structure. When sufficiently tensioned, the cable or rope 25 is secured to itself with fasteners 28. The resulting tensioned shape of the structure directs the flow of water and solids toward the center of the tank. The tensile structure density current baffle 20 does not require rigid structural supports in order to maintain its shape to perform its function.

In some embodiments, the density current baffle 20 is formed from a reinforced geomembrane fabric suitable generally known as Polyester Reinforced Ethylene Interpolymer Alloy (EIA). This material has been approved for use in water and wastewater treatment applications by National Science Foundation, the public health and safety organization. In one example, the reinforced geomembrane fabric used is comprised of 6.5-ounce heavyweight weft inserted knit polyester base fabric with polymeric adhesive coat that encapsulates the yarn and a face coat and back coat of Ethylene Interpolymer Alloy (EIA). The reinforced geomembrane fabric layer has superior tensile strength and puncture resistance, and minimal thermal expansion and contraction to maintain the shape of the density curtain baffle 20. The reinforced geomembrane adhesive coat has superior seam strength at static loads at elevated temperatures, prevents delamination due to flex loads, and prohibits moisture from penetrating cut edges. The non-crystalline polymetric structure of the face coat and back coat is not susceptible to environmental stress cracking while providing superior chemical and UV resistance. The reinforced geomembrane fabric will not stretch over time which would cause the density current baffle to deform, yet it is flexible enough to conform to the tensile structure current density baffle 20 shape as tension is applied to the inner tension rope or cable.

Figure 3:
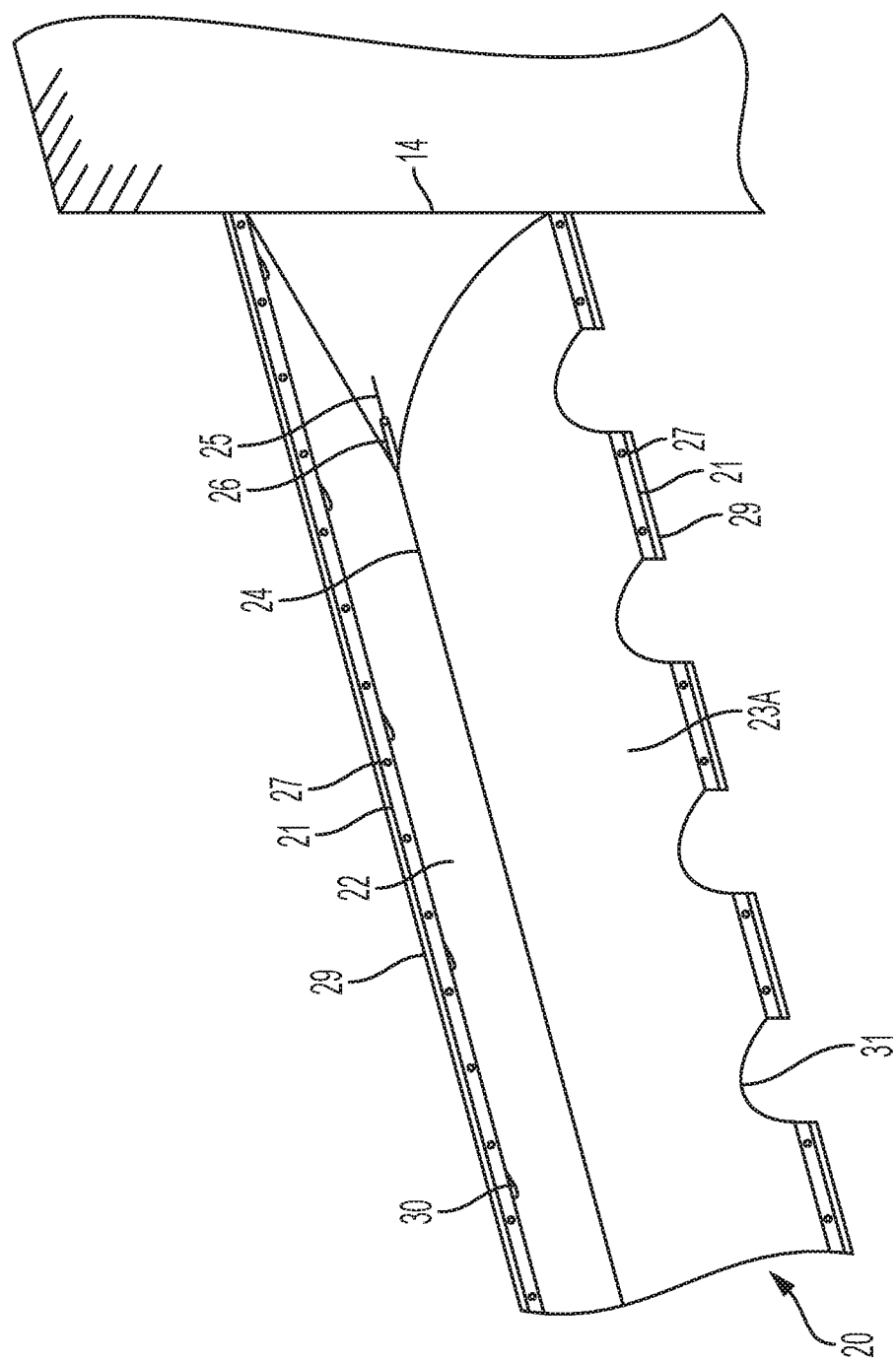
FIG. 3 illustrates an isometric view of the exemplary baffle of FIG. 1.

In the embodiment illustrated in FIG. 3, the finished shape of the upper baffle portion 22 of the central baffle portion 24 is a straight section in the form of a frustum, or truncated cone. The straight section of the upper baffle portion 22 sheds solids toward the center of the tank. The finished shape of the lower baffle portion 23A of the central baffle portion 24 is a concave curved section in the form of a concave arc, or segment of a hollow torus. The concave bottom surface of the resulting shape creates a curved flow pattern from the bottom of the wall toward the center of the tank. A series of small openings 30 in the upper baffle portion 22 may be employed to allow gas to escape from beneath the tensile structure current density baffle 20. A series of larger openings 31 in the lower baffle portion 23A may be employed to allow solids to escape from beneath the tensile structure current density baffle 20. Curved portions may be formed by modeling the shape using 3D modeling software, then cutting multiple panels from the tensile membrane using 2D patterning software. For example, to achieve the concave curved portion 23A, each panel of the curved shape has a convex edge. When the convex edges of adjoining panels are welded together, they form the 3D curved shape of a portion of a hollow torus.

Figure 4:
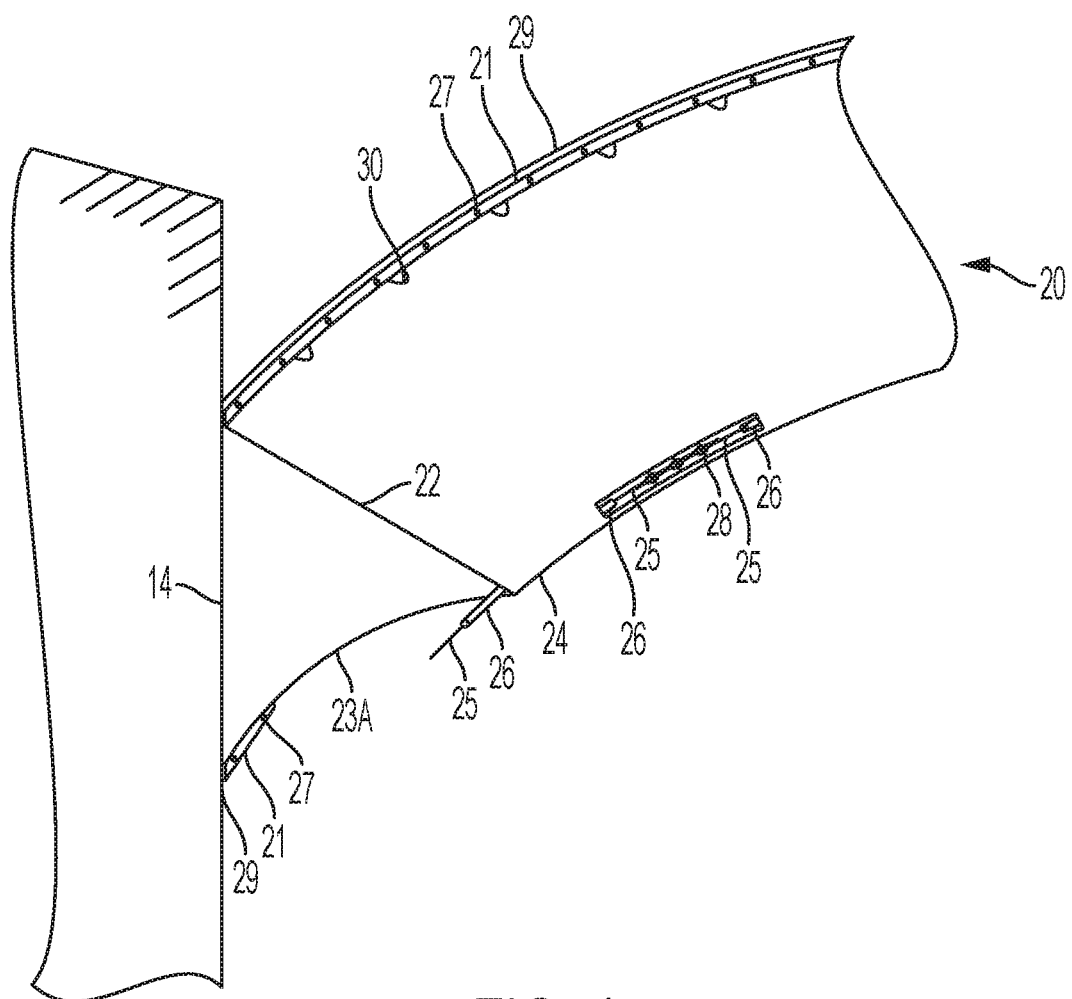
FIG. 4 illustrates a view of the fastening detail of the exemplary baffle of FIG. 1.
Figure 5:
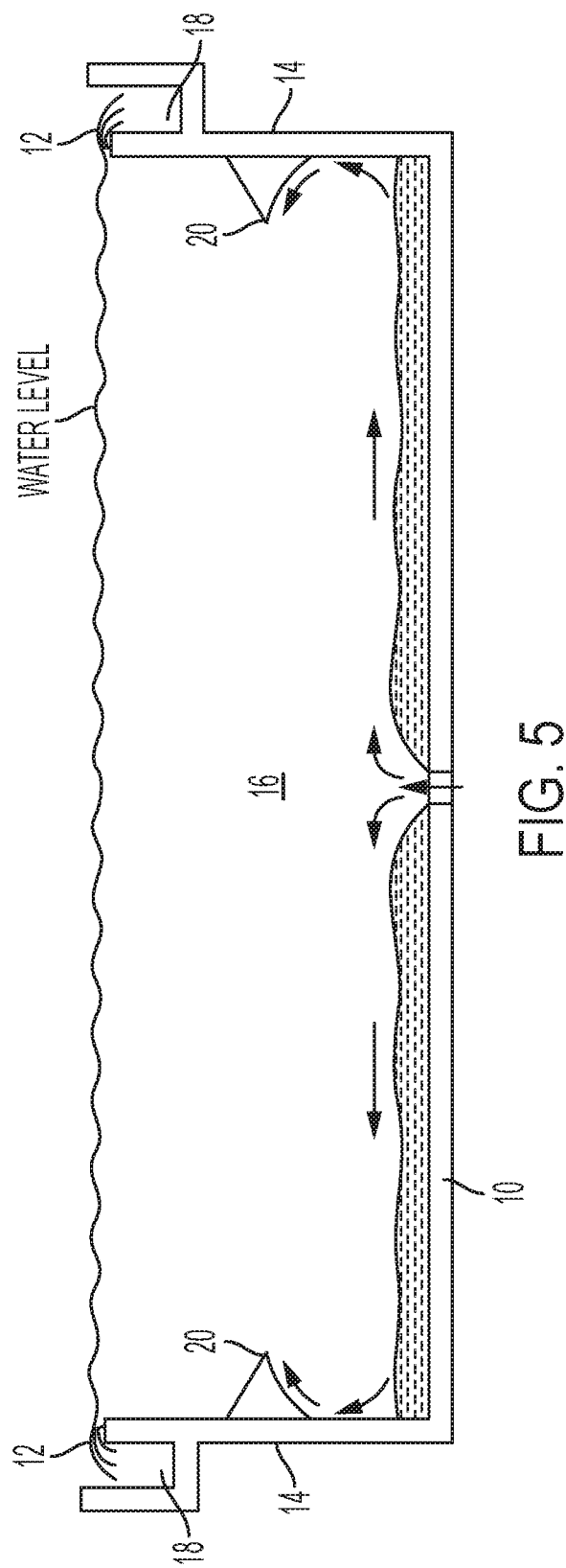
FIG. 5 illustrates an exemplary tensile structure density current baffle in a clarifier tank according to a second example of the invention.

In the embodiment illustrated in FIG. 4, the finished shape of the upper baffle portion 22 is a straight section in the form of a frustum, or truncated cone. The straight section of the upper baffle portion 22 sheds solids toward the center of the tank. The finished shape of the lower baffle portion 23A is a concave curved section in the form of a concave arc, or segment of a hollow torus. The concave bottom surface of the resulting shape creates a curved flow pattern from the bottom of the wall toward the center of the tank. A series of small openings 30 in the upper baffle portion 22 of the baffle membrane may be employed to allow gas to escape from beneath the tensile structure current density baffle 20.

Another embodiment is illustrated in FIGS. 5-8. As in the previous embodiment, an upward curving tensile structure density current baffle 20 is shown within a clarifier tank 10. Where reference characters in FIGS. 5-8 are the same as in FIGS. 1-4, reference may be made to the written description of FIGS. 1-4, and such description is not repeated here for purposes of brevity. In the second example as shown in FIGS. 5-8, density current baffle 20 maintains a central baffle portion 24 that is configured to be attached at the upper and lower end, to side wall 14.

The upper baffle portion 22 of the central baffle portion 24 and lower baffle portion 23B of the central baffle portion 24 extend outwardly, away from the side wall 14. The upper baffle portion 22 and lower baffle portion 23B are joined in a junction at the inward end towards the center of the tank 10. When the cable 25 is tensioned, the baffle portions create a continuous tensile membrane shape.

In the example illustrated in FIGS. 5-8, the finished shape of the upper baffle portion 22 is a straight section in the form of a frustum, or truncated cone. The straight section of the upper baffle portion 22 sheds solids toward the center of the tank. The finished shape of the lower baffle portion 23B is also a straight section in the form of a frustum. The straight bottom surface creates a straight flow pattern from the bottom of the wall toward the center of the tank. A series of small openings 30 in the upper baffle portion of the baffle membrane may be employed to allow gas to escape from beneath the tensile structure current density baffle 20. A series of larger openings 31 in the lower baffle portion of the baffle membrane may be employed to allow solids to escape from beneath the tensile structure current density baffle 20.

Figure 6:
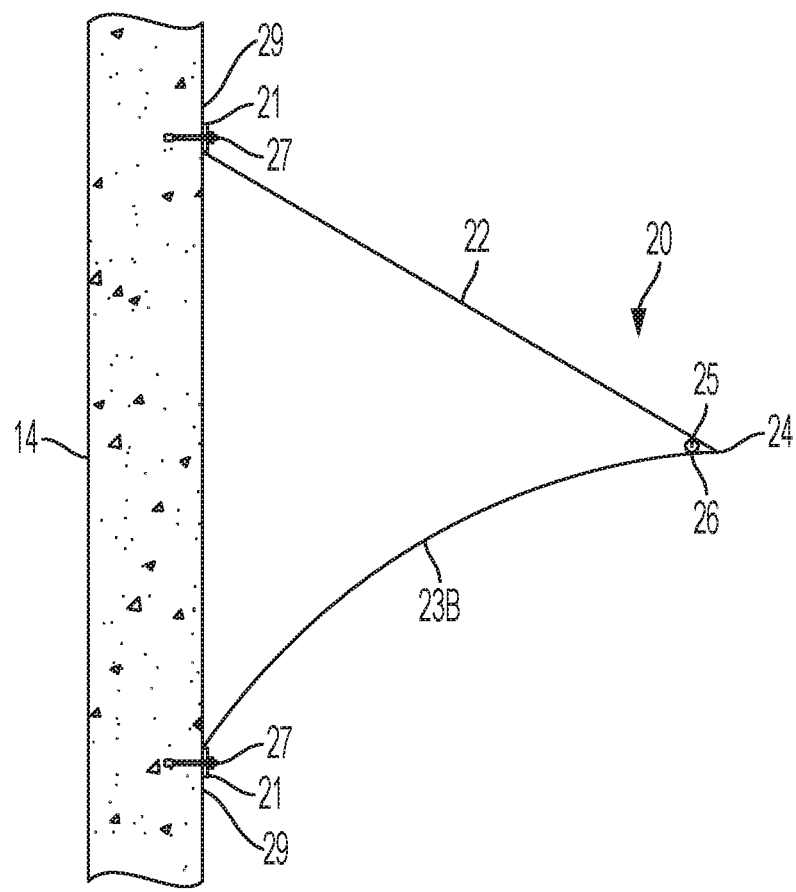
FIG. 6 illustrates a section of the central baffle portion of the exemplary baffle of FIG. 5.
Figure 7:
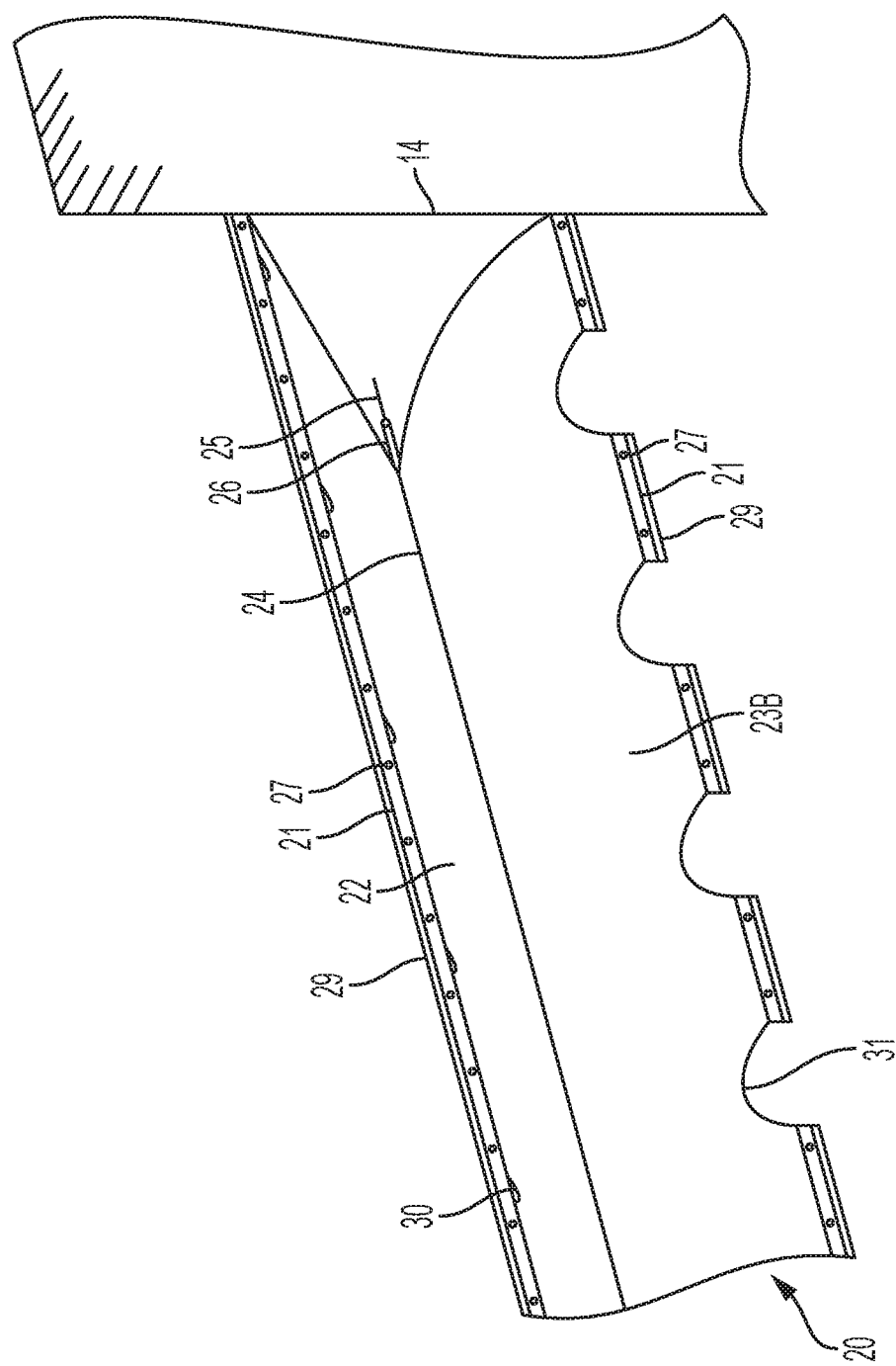
FIG. 7 illustrates an isometric view of the exemplary baffle of FIG. 5.
Figure 8:
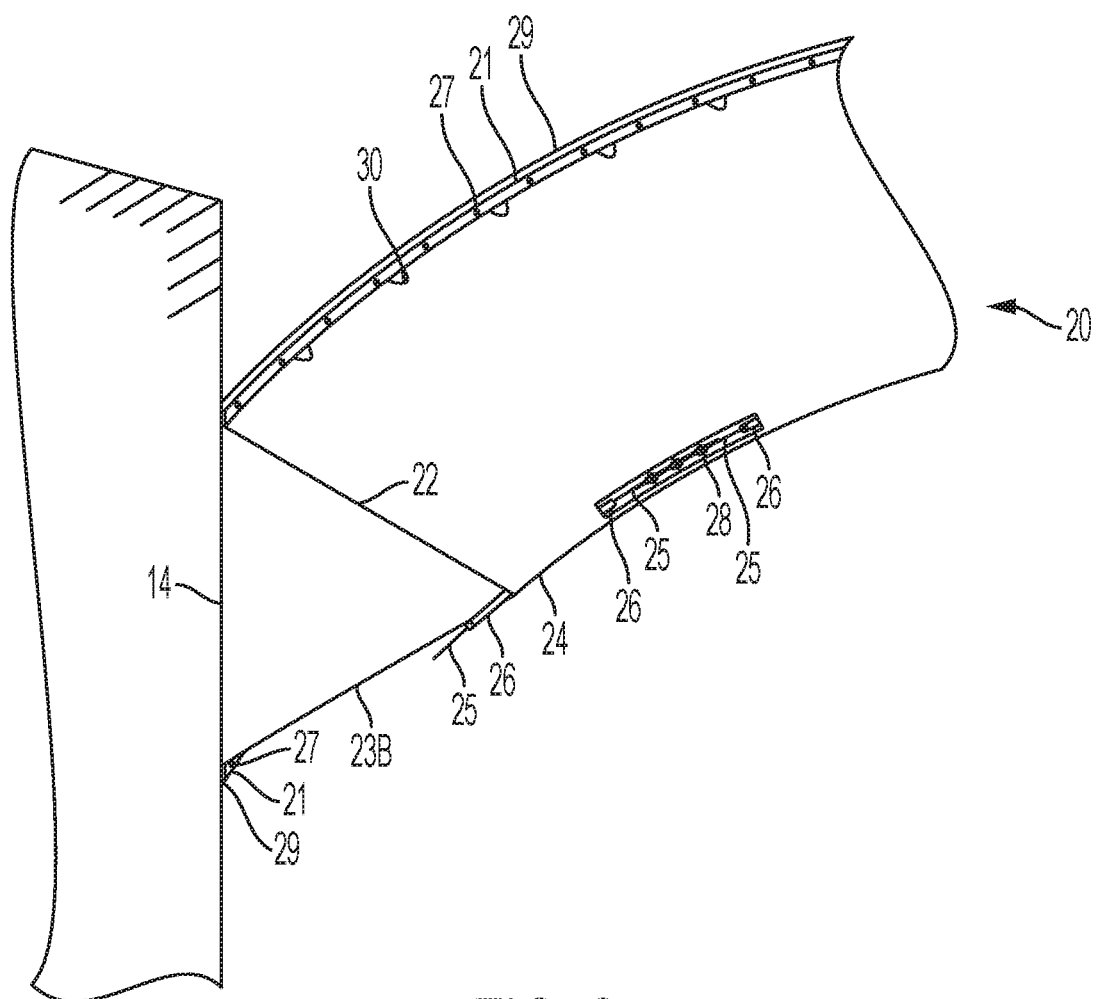
FIG. 8 illustrates a view of the fastening detail of the exemplary baffle of FIG. 5.

In the example illustrated in FIGS. 6-8, the finished shape of the upper baffle portion 22 and the lower baffle portion 23B are straight sections in the form of a frustum, or truncated cone. The straight section of the upper baffle portion 22 sheds solids toward the center of the tank. The bottom surface of the resulting shape creates a straight flow pattern from the bottom of the wall toward the center of the tank. A series of small openings 30 in the upper baffle portion of the baffle membrane may be employed to allow gas to escape from beneath the tensile structure current density baffle 20.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A tensile structure density current baffle for use in a clarifier tank having a side wall, comprising:
    a tensioning cable; and
    a central baffle portion formed from a membrane fabric, the central baffle portion having an upper baffle portion with an upper end, a lower baffle portion with a lower end, and a junction between the upper baffle portion and the lower baffle portion, the tensioning cable engaging the central baffle portion at the junction, the upper end of the central baffle portion being fastenable to the side wall of the clarifier tank above the junction and the lower end of the central baffle portion being fastenable to the side wall of the clarifier tank below the junction;
    wherein, when the upper end and lower end are fastened to the side wall of the clarifier tank and the tensioning cable is tensioned, the tensioning cable and membrane fabric comprise a self-supporting tensile structure that extends toward the center of the clarifier tank.

2. The tensile structure density current baffle of claim 1, wherein the tensile structure density current baffle is adapted to be fastened to a circular clarifying tank.

3. The tensile structure density current baffle of claim 1, wherein the membrane fabric comprises Ethylene Interpolymer Alloy.

4. The tensile structure density current baffle of claim 1, wherein the upper baffle portion is in the shape of a frustum.

5. The tensile structure density current baffle of claim 1, wherein the lower baffle portion is in the shape of a frustum.

6. The tensile structure density current baffle of claim 1, wherein the lower baffle portion is curved in the shape of a portion of a hollow torus.

7. The tensile structure density current baffle of claim 1, wherein the upper end further comprises a first hem and the lower end further comprises a second hem, and the first and second hems are fastenable to the side wall.

8. The tensile structure density current baffle of claim 1 further comprising a first batten bar for attaching the upper end to the side wall and a second batten bar for attaching the lower end to the side wall.

9. The tensile structure density current baffle of claim 1, wherein the junction of the intermediate central baffle comprises a conduit, and the tensioning cable is disposed within the conduit.

* * * * *